(12) United States Patent
Zanella et al.

(10) Patent No.: US 7,176,413 B2
(45) Date of Patent: Feb. 13, 2007

(54) METHOD AND SYSTEM FOR CONTROLLING ONE OR MORE SHAPE MERCURY ACTUATORS

(75) Inventors: Alessandro Zanella, Turin (IT); Francesco Butera, Turin (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/142,494

(22) Filed: Jun. 2, 2005

(65) Prior Publication Data
US 2005/0275196 A1 Dec. 15, 2005

(30) Foreign Application Priority Data
Jun. 10, 2004 (EP) .................................. 04425427

(51) Int. Cl.
*B60L 1/02* (2006.01)
*B60R 16/00* (2006.01)
(52) U.S. Cl. .................... 219/202; 219/209; 280/727
(58) Field of Classification Search ............ 219/202, 219/209, 505, 543; 280/727
See application file for complete search history.

(56) References Cited

U.S. PATENT DOCUMENTS

| | | | |
|---|---|---|---|
| 4,753,465 A * | 6/1988 | Dalby | 292/32 |
| 4,930,494 A | 6/1990 | Takehana et al. | |
| 5,510,598 A * | 4/1996 | Kawam et al. | 219/505 |
| 5,763,979 A | 6/1998 | Mukherjee et al. | |
| 6,286,326 B1 * | 9/2001 | Kopko | 62/179 |
| 6,296,636 B1 * | 10/2001 | Cheng et al. | 606/32 |
| 6,323,459 B1 | 11/2001 | Maynard | |
| 6,342,826 B1 * | 1/2002 | Quinn et al. | 337/300 |
| 6,427,712 B1 * | 8/2002 | Ashurst | 137/62 |
| 6,732,516 B2 * | 5/2004 | Butera et al. | 60/527 |
| 6,871,519 B2 * | 3/2005 | Butera et al. | 70/256 |
| 7,017,345 B2 * | 3/2006 | Von Behrens et al. | 60/527 |
| 2005/0156468 A1 * | 7/2005 | Hentsch et al. | 307/10.1 |

FOREIGN PATENT DOCUMENTS

EP WO 03/003137 1/2003

* cited by examiner

*Primary Examiner*—Robin Evans
*Assistant Examiner*—Vinod Patel
(74) *Attorney, Agent, or Firm*—Nixon & Vanderhye P.C.

(57) ABSTRACT

A method and a system for controlling a plurality of shape-memory actuators, for instance installed on board a motor vehicle, control the electric supply current of each shape-memory elements as a function of one or more parameters referring to environmental conditions, such as environment temperature and temperature of memory-shape actuator, of available supply voltage for motor vehicle battery, of previous actuations, or of previous activation requests of shape-memory actuators.

14 Claims, 5 Drawing Sheets

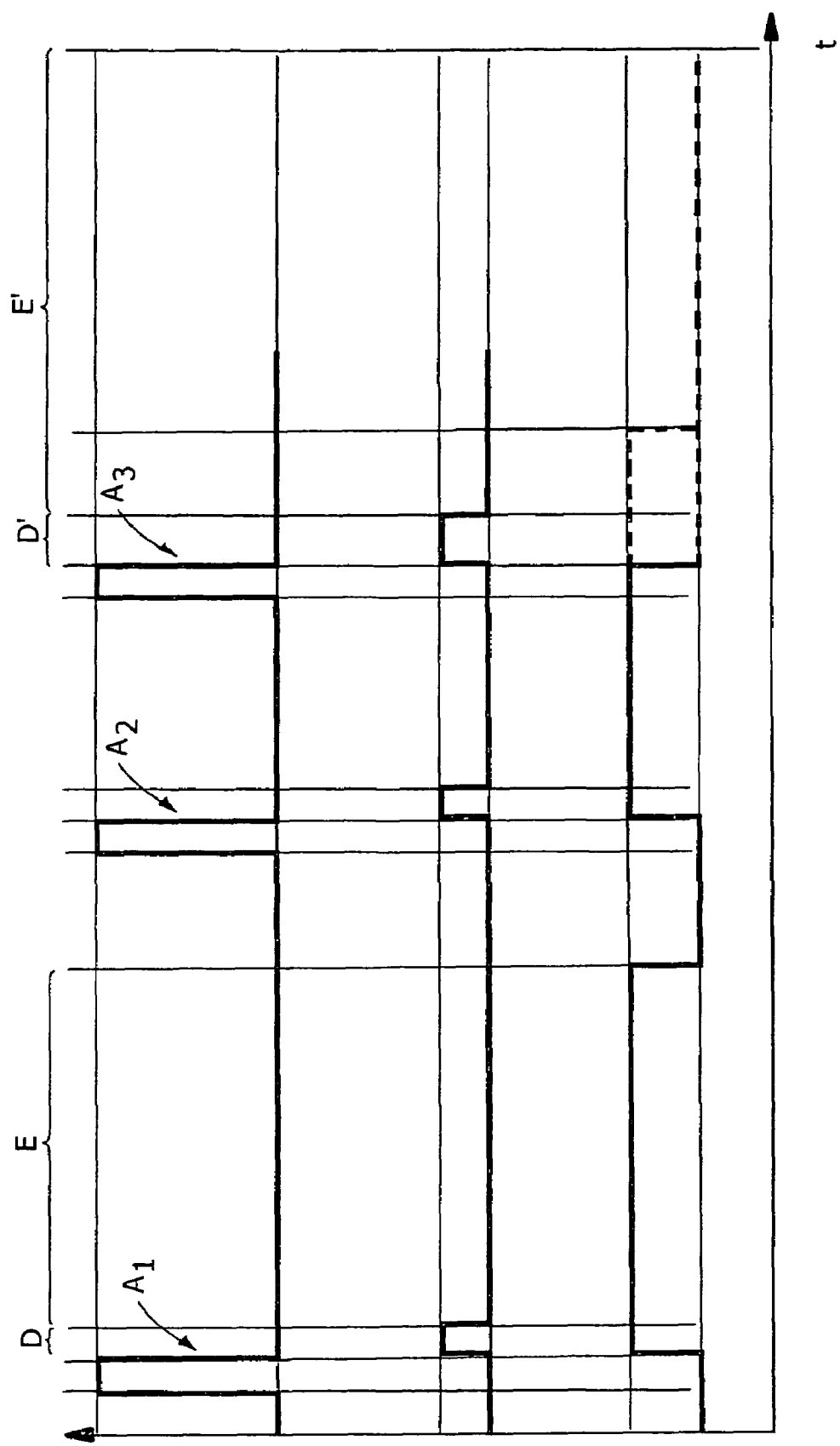

METHOD AND SYSTEM FOR CONTROLLING ONE OR MORE SHAPE MERCURY ACTUATORS

BACKGROUND OF THE INVENTION

The present invention refers to the field of shape-memory actuators of the type comprising at least a shape-memory element, which can change its shape upon variation of its temperature beyond a transition value, and means for supplying an electric current through the shape-memory element in order to cause a variation of its temperature.

Shape-memory elements have been known and used for a long time in several technical fields. They exploit the property of some metal alloys, which are able to undergo a change in state when temperature varies beyond a transition value. The Applicant is owner of several patents and patent applications concerning applications of shape-memory actuators in many fields, for instance in the automotive field, for controlling locks of motor vehicle doors, distributing devices in air conditioning systems for motor vehicles, adjustment devices for rear-view mirrors, etc. The Applicant has proposed in particular shape-memory cable actuators (either flexible-cable or stiff-cable actuators), i.e. independent devices that can be used in several fields for controlling any mobile member (see for instance WO 03/003137 A1).

The advantage of shape-memory actuators consists in that they have a relatively simple and cheap structure, with small size and low energy consumption. Studies and tests made by the Applicant in view of a wide application of shape-memory actuators, for instance for controlling a series of operating members in a motor vehicle, have pointed out the need and advantage of developing control systems and methods enabling a further improvement of the efficiency and advantages of said actuators.

SUMMARY OF THE INVENTION

In view of achieving said objective, the present invention relates to a method for controlling one or more shape-memory actuators of the type comprising at least one shape-memory actuator, which can change its shape upon variation of its temperature above a transition value, in which means are arranged for supplying an electric current through the shape-memory element of each shape-memory actuator, characterized in that said method includes the following steps: detecting environmental conditions of each shape-memory actuator by monitoring one or more parameters chosen among: environment temperature, temperature of shape-memory element, available electric supply voltage, and controlling the intensity and/or duration of electric current supplied to each shape-memory element as a function of detected environmental conditions.

In the framework of said basic principle, several advantageous strategies can obviously be carried out. Let us consider for instance the case of a motor vehicle lock whose opening can be controlled both manually, by acting upon a handle, and electrically, by activating a shape-memory element (see for instance WO 03/003137 A1). In an embodiment that has already been implemented by the Applicant, the shape-memory element of the actuator is got through by an electric current for a given time of about a few ms. Lock opening detection results in the automatic interruption of current pulse. Said method does not ensure a rationalization and optimization of the system, either from the point of view of energy consumption or from the point of view of actuator protection from possible damages. According to the invention, conversely, it is provided to adjust for instance the duration of the current pulse supplied to the shape-memory element as a function of detected environment temperature. If for instance said environment temperature is higher, the current pulse required for bringing the shape-memory element to its transition temperature will be smaller and/or shorter. Moreover, if for instance the temperature of said shape-memory element as detected by the system is higher, the required current pulse will again be shorter, if necessary envisaging also a short delay (of about a few ms) in current pulse activation, when the detected temperature of the actuator element is such as to possibly cause a damage to said element due to overheating. Still according to a further possible strategy, if for instance the engine of a motor vehicle is started at a very low temperature, the detection of an accordingly low temperature of the actuator element can activate automatically a pre-heating device for the shape-memory element, so as to ensure that, when the actuator is activated, it is already at not too low a temperature.

These are obviously only possible examples of the various strategies to be used according to the invention in the framework of the basic principle disclosed above. Moreover, should the invention be applied to a system comprising a plurality of shape-memory actuators, for instance within the same motor vehicle, electric supply voltage to the various actuators can be changed depending on their operating conditions.

The temperature of the material which the shape-memory element is made of can be evaluated on the basis of intrinsic features, such as resistivity before actuation, or on the basis of environmental parameters and, if necessary, on the basis of the period before actuation in case of repeated actuations.

Thanks to the control of the type of pulse to be supplied to the memory-shape actuators through the evaluation of environmental conditions, a series of results can therefore be achieved:

optimize actuator fatigue life,
minimize energy consumption with the same function,
optimize and make the perception of function features by the user constant.

The evaluation of environmental conditions can be made straight before actuation or periodically, using in case of actuation the parameters calculated and ready for use in the memory (the period should be defined depending on the requirements concerning specific actuations, calculation capacity of the system and car management requirements as a whole).

BRIEF DESCRIPTION OF THE DRAWINGS

The invention will now be described with reference to the accompanying drawings, which are provided by way of non-limiting example and in which:

FIGS. 4, 5, 6, 7 and 8 are diagrams also showing the control criteria that can be implemented by means of the system and method according to the invention.

DETAILED DESCRIPTION OF THE INVENTION

Figure 1:
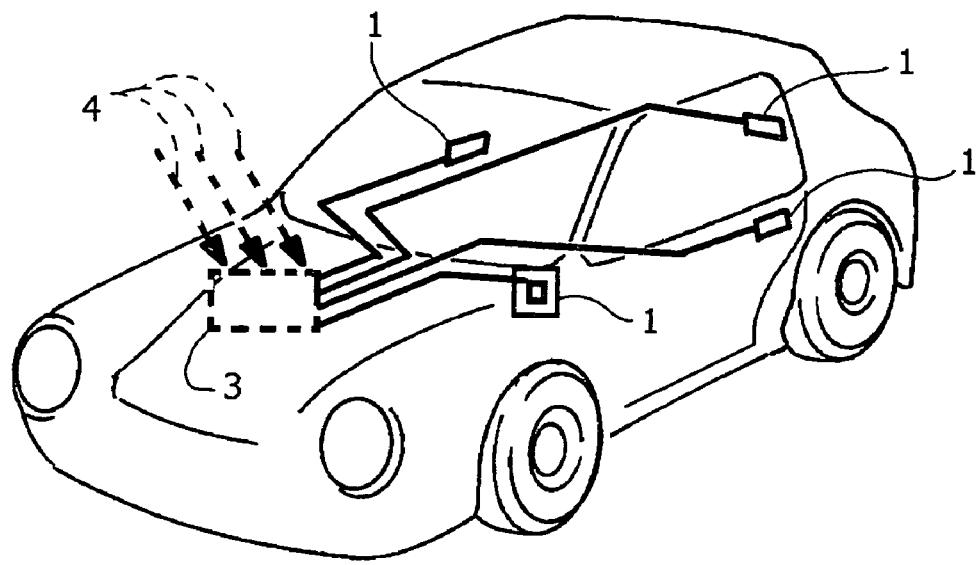
FIGS. 1, 2 and 3 are three diagrams concerning three different strategies for using the system according to the invention.

FIG. 1 is a diagram showing the application of a system according to the invention to the control of a plurality of shape-memory actuators 1 installed on board a motor vehicle 2. The actuators 1 can include actuators for acting upon locks of motor vehicle doors, actuators for controlling mobile elements for air distribution in a motor vehicle air conditioning system, actuators for controlling mobile elements such as outer rear-view mirrors of the motor vehicle, etc. The actuators 1 are supplied with electric current pulses by the supply battery of the electric on-board circuit, with the intervention of a central control unit 3, which receives as input a plurality of signals 4 from sensor means detecting a plurality of environmental parameters, such as outer temperature, temperature of shape-memory elements of actuators 1, electric supply voltage available from battery. On the basis of the signals 4, the central control unit 3 adjusts the intensity and duration of current pulses supplied to the actuators 1 using several possible strategies.

Figure 2:
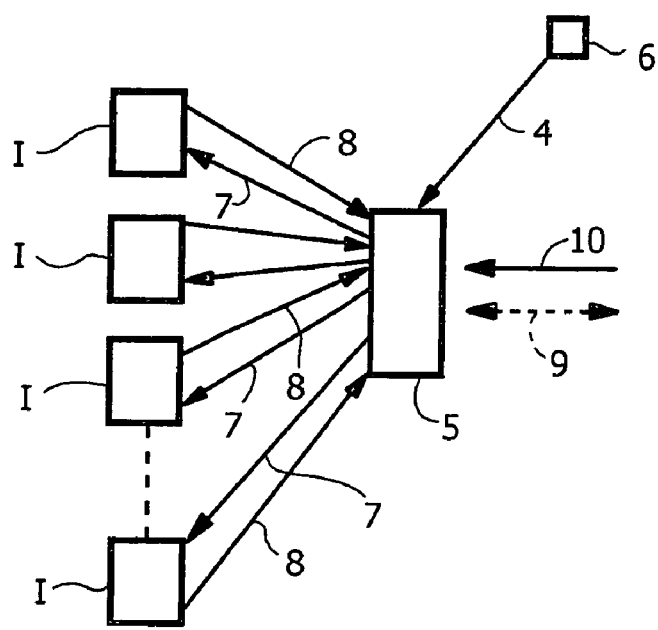

The system according to the invention can also be implemented with a centralized or decentralized structure, according to several possible system architectures disclosed below. FIG. 2 is a diagram of a first possible architecture of the system according to the invention. Data transmission takes place on any data line, which can be for all the cases described below a CAN, LIN or Bluetooth line, or any other wireless or similar line. With reference to FIG. 2, number 5 refers to an electronic central unit acting as central node receiving one or more signals 4 from a sensor 6 and sending supply pulses 7 to a plurality of shape-memory actuators 1. The latter are associated with further sensor means (detecting for instance the temperature of the material the shape-memory elements are made of through an evaluation of intrinsic features, such as resistivity before an actuation), which therefore send to the central unit 5 signals 8 as output from said sensors associated to the shape-memory elements. Number 9 refers to data line and number 10 to supply line.

Thus, in the system according to FIG. 2 there is only one central unit 5 acquiring and/or calculating environmental parameters and peripheral feedback or safety signals and transmitting accordingly the power pulse directly to all actuators.

Figure 3:
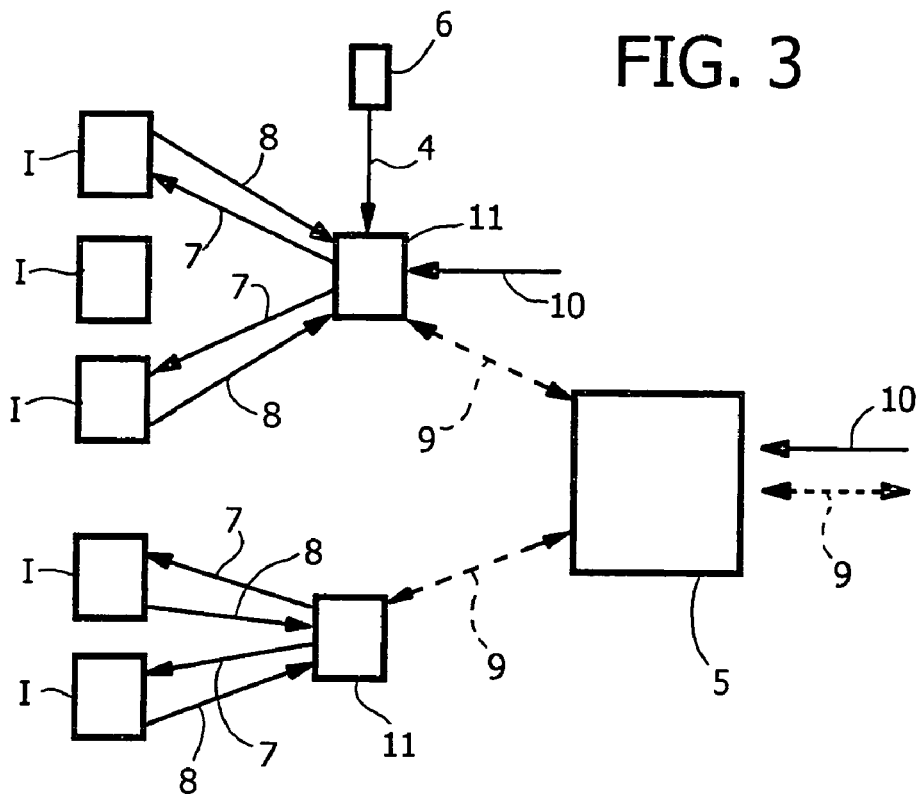

FIG. 3 shows a second embodiment of the system. In said figure the same numbers are used for the same elements as in FIG. 2. The main difference with respect to the architecture of FIG. 1 consists in that here, in addition to the central unit 5, there are also electronic peripheral units 11. Here again control is centralized, with data transmission-reception through data line. The starting pulse is generated by the peripheral units 11, which group series of actuations with series of sensors and actuators thereto associated. Actuation logic and coordination on the motor vehicle (for instance for simultaneously blocking door locks) are implemented by the central node.

Figure 4:
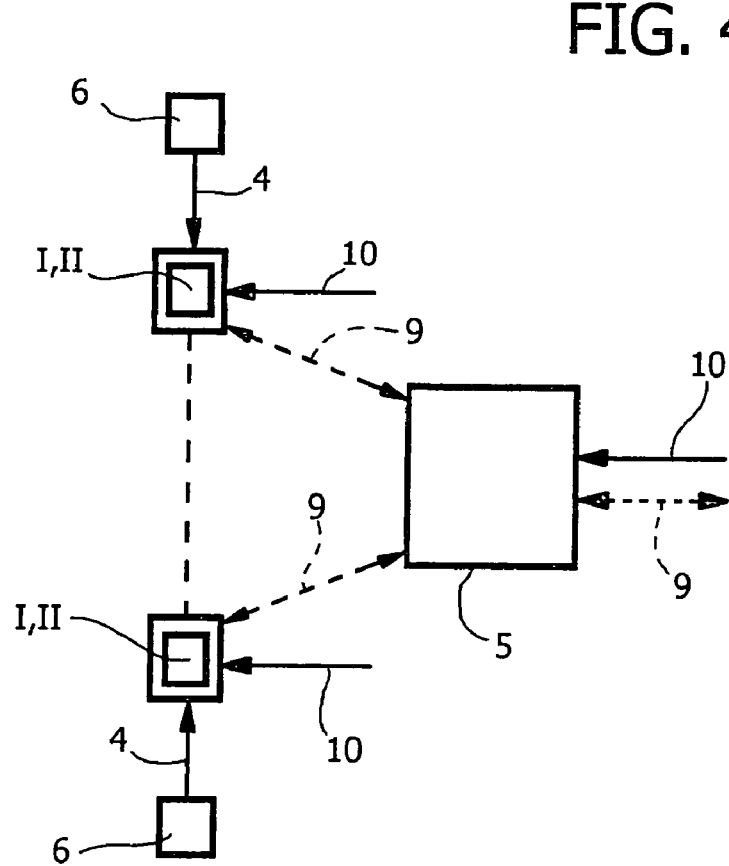

The architecture of FIG. 4 is basically the same as in FIG. 3, but it has local nodes 11 (door node) coordinating only the local management logic of several actuators, whereas the power pulse is generated by the electronic system of the actuator (actuator node) connected to the battery, to the data line and to local sensors, if present.

Figure 5:
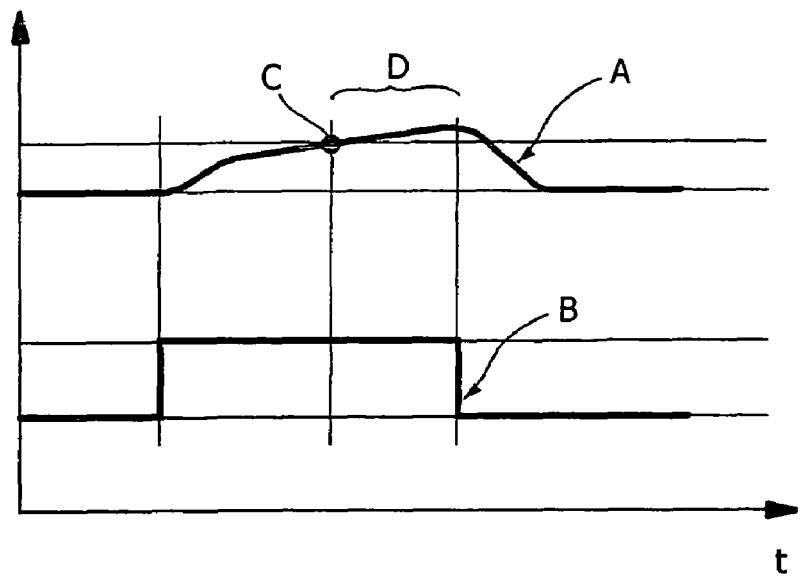
Figure 6:
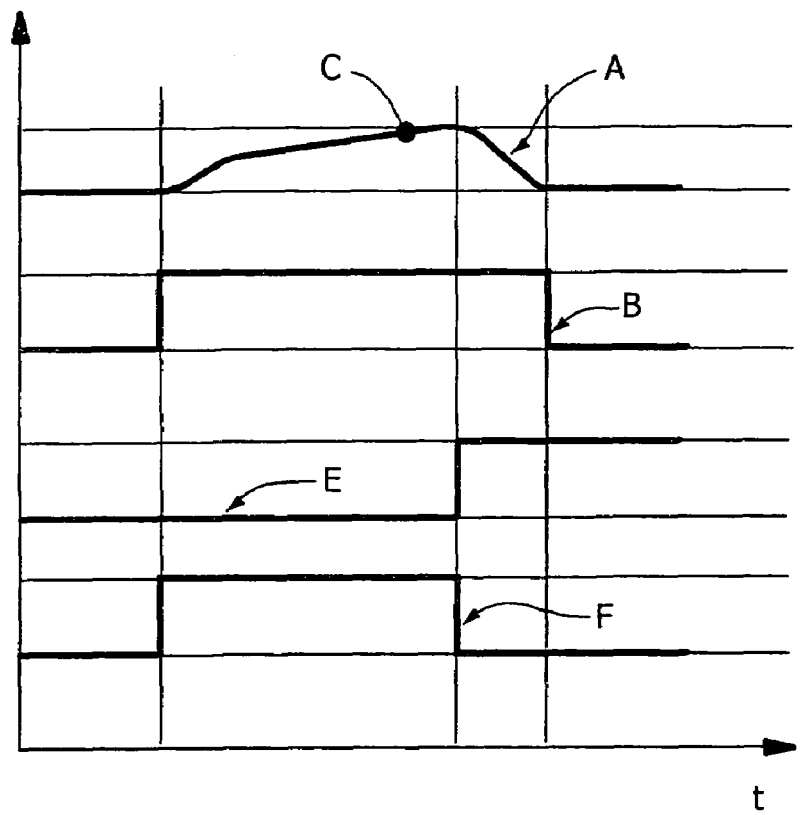

The strategies that can be implemented for actuator control can be classified according to different types, both referring to actuation mode and to supply pulse. Several types of actuation can be implemented as a function of time and feedback.

timed pulse, independent from a position feedback signal: the supply pulse of the actuator is kept for a given time and interrupted at the end of said time, without checking the position reached by the actuator. This is the preferred case for controlling actuators acting as mechanical hooking or as bistable switch. FIG. 5 shows the corresponding diagram of said actuation. Line A refers to the displacement of the member controlled by actuator in time, and line B refers to the supply pulse timed by the electronic control unit. Point C of line A corresponds to the position of achieved actuation. After reaching point C, the supply pulse is extended for a time interval D, which thus results in a limited overheating of the shape-memory element.

a second actuation mode still includes a timed pulse, independent from any position feedback signal, as in FIG. 5, but with the presence of safety switch. This actuation can be applied to actuators acting as mechanical hooking or mechanical bistable switches. FIG. 6 shows the corresponding diagram, where line A refers to actuator displacement, point C of said line refers to the position of achieved actuation, line B refers to the supply pulse timed by the control central unit, line E refers to the state of a control switch, which is activated mechanically once the actuator has reached a maximum stroke, so as to interrupt supply, whereas line F refers to the actual supply to the shape-memory element corresponding to the pulse of line B, however interrupted upon intervention of the safety switch.

Figure 7:
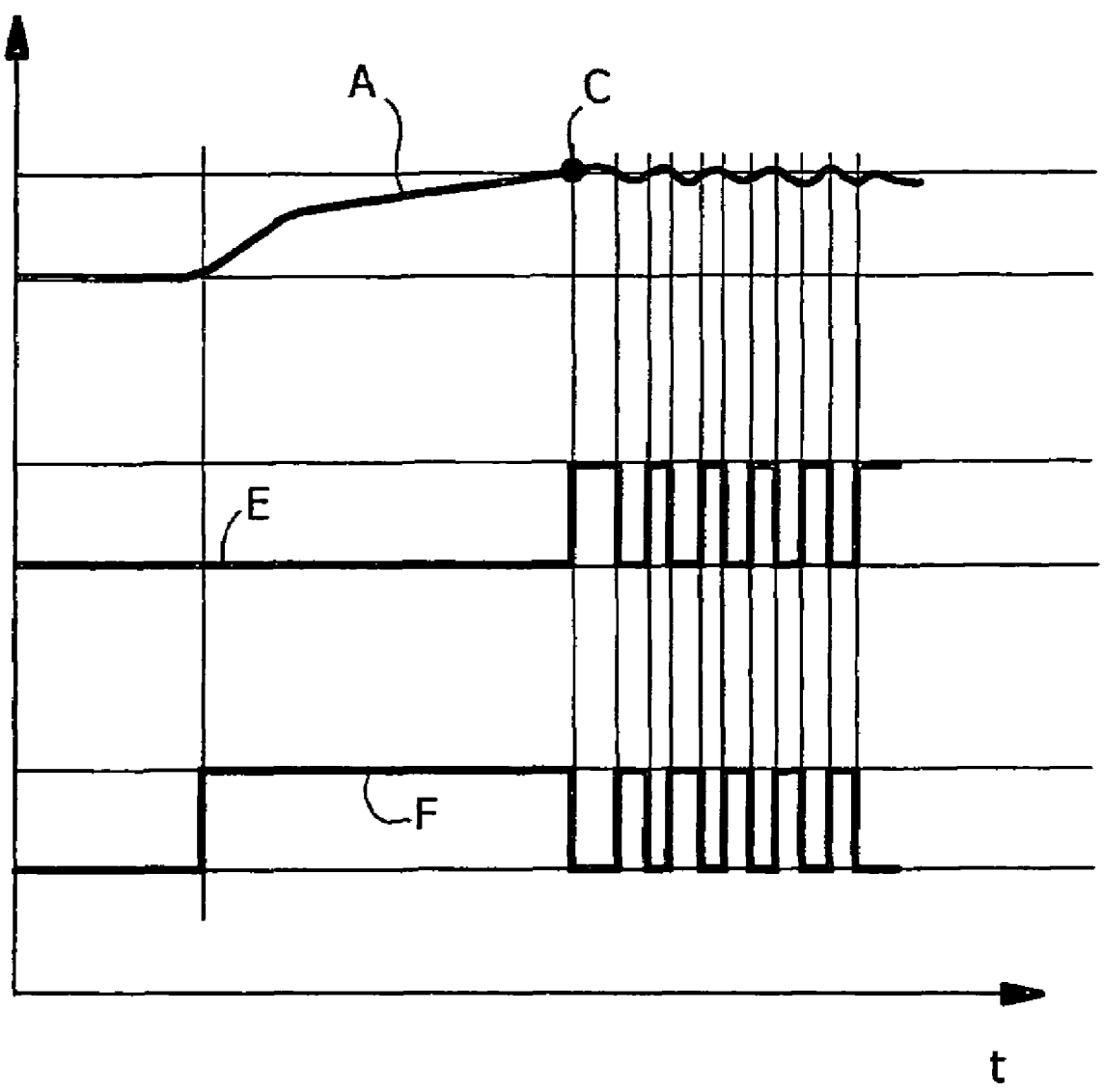

A further supply criterion relates to an indefinite time supply pulse, without timing but with a position feedback signal. Said strategy is to be used in case of proportional actuators of electric bistable switches. With reference to said strategy, FIG. 7 shows a diagram representing the line referring to actuator displacement, a line E referring to the state of a control switch, and a line F referring to the electric supply pulse to the wire, which is controlled upon achievement of a balance corresponding to point C in diagram A.

Also the supply pulse can be of different type. As a matter of fact, there can be the following types of pulse:

constant voltage corresponding to maximum battery voltage;

voltage corresponding to a fraction of maximum battery voltage (in case of 42 V battery or use with voltages below 12 V) obtained with PWM with constant direct current as control to the power device used (MOS or other)

introduction of HW electronic filters in order to avoid voltage peaks on PWM (series inductance or parallel capacity)

use of PWM frequency out of acoustic band in order to avoid acoustic emission in comfort actuators variable voltage of PWM direct current modulation during actuation for control optimization, for instance for immediate high power actuation so as to speed up heating step with following power reduction so as to slow down in the vicinity of control points (in case of proportional actuation or with timing-dependent management)

pre-actuation pulses—following the points previously set so as to heat up the actuators without mechanical shift (for instance for pre-heating of door actuators from remote control or passive entry).

As far as the evaluation of outer environmental parameters used for the optimal management of shape-memory elements is concerned, several parameters can be evaluated:

outer temperature with sensors on board the motor vehicle and information reading from data line, actuator on-site temperature by evaluation of material physical properties (actuator impedance—resistive and non-resistive component), estimated actuator on-site temperature depending on previous actuations—multiple actuations and actual rest times, battery voltage from outer central units on data line or from dedicated electronic system.

Some examples of supply strategies for one or more shape-memory actuators belonging to the system according to the invention, installed on board a motor vehicle, will now be described.

Low Temperatures Pre-Heating

Pre-heating pulses can be provided through a PWM with suitably set duty cycle so as to supply an insufficient power for the actuation of the controlled member (for instance for opening the lock of a door controlled by the actuator), but such as to bring actuation to suitable temperatures for an actual actuation in standard times. For instance, in case of actuation of "passive entry" door locks, when the user approaches the car with his/her own remote control, the system releases the locks and the locks are ready to be opened without using the key. In this case the actuator of the door electric opening system can be pre-heated. The setting of pulse duty cycle takes into account environment temperature and battery voltage, as well as the features of the specific actuator. As an alternative, a position feedback signal corresponding to a non-actuation position differing from rest position can be used, which enables to interrupt pre-heating pulse before achieving actuation condition.

In the specific case of simultaneous opening of door locks from outside according to "passive entry" mode, in which the system detects automatically the vicinity of user's remote control, the actuator can be provided with two position references, one signaling actual actuation and the other corresponding to a position representing a given percentage with respect to final actuation position. In current systems, when the identifying device carried by the user (a transponder) gets near the car, the electronic central unit on board the motor vehicle first identifies the presence of the transponder, then starts identifying the specific transponder in order to check whether it is the authorized user. Once the identification is carried out, locks are released. With the pre-heating system the motor vehicle can start pre-heating the actuator as soon as it detects the presence of a transponder within its range of action, so that time for identifying and decoding the specific transponder is used also for pre-heating the actuator and then, if necessary, carry out actuation very rapidly. Differently from current systems, this method enables a much more rapid opening, because with traditional actuators pre-heating is unnecessary and does not help to anticipate actuation, which however takes place with shape-memory actuators. As can be observed, in said specific application shape-memory actuators are used for controlling lock release. However, the invention further includes any application envisaging the use of shape-memory actuators not for lock blocking or release, or not only for this, but for controlling, the lock being released, the opening of said lock (useful for instance for hatchback door or bonnet) instead of manually opening the lock acting upon a control handle or using a key.

Modulation of Fixed Duration Pulses Upon Variation of Temperature and Battery Voltage The actuator requires a heating step of variable duration depending on outer temperature, on actuator temperature and on battery voltage (electric power exchanged by Joule effect is proportional to the square of voltage ($V^2/R$)). Anyway, for reasons of reliability in the management of electric signals, the switch interrupting supply pulse is preferably managed with debouncing systems and low-pass filters in order to limit noises; this results in that, from the actual achievement of the final position to the end of the electric pulse a time interval of about 50 ms can elapse. For long actuations (>200–250 ms) or with low outer environment temperature, 50 ms of oversupply do not damage the actuator, though they cause an overheating. For high temperature short actuations (for instance 12 V for controlling the release of a lock with a stroke of 4 mm and with environment temperature on actuator of 60° C.), the addition of 50 ms of pulse can correspond to an additional 30% of pulse; in this case overheating becomes consistent.

For these reasons the use of a constant time pulse without position feedback or achieved actuation feedback results in a pulse duration that cannot be suitable either at low and at high temperatures. The use of an achieved actuation feedback enables to switch off supply to the actuator as soon as actuation function has been completed.

If actuation is implemented by a pulse without position feedback, said pulse will be a definite duration pulse. Anyway, also with feedback position there must be a maximum time within which the pulse should be interrupted for safety reasons. In all these cases, the duration of the actuation pulse (maximum safety time pulse) should be defined as a function of environment temperature, of actual or alleged actuator temperature and of battery supply voltage (if actuator supply voltage is not adjusted upstream independently from the variability of battery voltage). The modulation of supply pulse duration enables both to protect the actuator from damages due to overheating, and to keep the conditions required for a rapid cooling of the actuator during return with subsequent function renewal in short times, i.e. to optimize actuation for repeated use in short times.

Actuator Protection in Case of Repeated Pulses: Variable Set Rest Times

In case of repeated pulses, the actuator can overheat if rest time between previous actuations is not sufficient for cooling.

A method for protecting the actuator according to the invention, in case of repeated actuations, consists in introducing set rest times between an actuation and the following one. As further protection, said rest time can have a variable duration as a function of the temperature of the shape-memory material in the actuator as measured or estimated (depending on previous actuations) before actuation. An electronic control method can set a minimum cooling rest time between an actuation and the following one. Said rest times can be set on hardly noticeable values for the first actuations, so as not to jeopardize function perception during normal actuator use, but they can have an increasing duration after every pulse, so as to enable a better cooling of the actuator.

Moreover, every actuation can be characterized by a rest time value and a control time: the first one is the minimum time between an actuation and the following one, considered as time in which the second actuation is not enabled (inhibition rest time); the second one is the minimum cooling time beyond which the previous actuation does not affect new actuations (check time or rest time). Once opening is carried out, an inhibition rest time pulse and a check rest time pulse are generated. During the inhibition rest time further actuation requests are ignored or, if necessary, transferred until the end of inhibition rest time. If an actuation request occurs during check rest time but after inhibition rest time, actuation takes place and the values of both rest times increase according to calculated or tabulated values. If no request takes place during check rest time, the duration of both rest times do not change, provided that they already correspond to the minimum possible rest time, or they decrease according to calculated or tabulated values. Said control strategy is represented in accompanying FIG. 8 where diagrams A, B, C show the time development of actuations (A), of inhibition rest times (B) and of check rest times (C). As can be seen, after a first actuation $A_1$ of a series of repeated actuations $A_1$, $A_2$, $A_3$, there is a time interval D corresponding to inhibition rest time. If during time interval D a new actuation request should occur, it would be ignored. Time interval D therefore corresponds to a compulsory cooling rest time. After time interval D there is again a time interval E corresponding to check rest time. If during time interval E no further actuation request occurs, the values of both rest times (inhibition and check) decrease to a lower degree in a series of tabulated values.

Said decrease cannot however reduce rest time E below a minimum time interval. Still referring to FIG. 8, it can thus be observed that after a second actuation $A_2$, which was requested after elapse of rest times D and E, there is a third actuation request $A_3$ when check rest time (diagram C) after actuation $A_2$ has not ended yet. This results in the following extension of the duration of both inhibition and check rest times according to a given algorithm or a predefined value table.

The system can further comprise a third duration account longer than the other, beyond which the duration of rest times is anyhow adjusted to the minimum value admitted in absence of actuations during the validity period of the account and without using the mechanism defined in check rest times, according to which times are decreased sequentially.

The statistical account of the actuations that took place in the short history of the actuation can further enable a suitable supply pulse modulation (time reduction of said pulse and/or reduction of supply voltage so as to reduce thermal inertias). Anyhow, there is the need for pulse modulation whenever the actuator is warm. This occurs if outer environment temperature is high or in case of repeated actuations. If environment temperature is known, temperature on the actuator can be estimated, although point temperature alone is not sufficient.

If the motor vehicle is parked in the sun, inner temperature increases because of sun rays up to much higher values than outer temperature. In this case reached temperature can be estimated, also taking into account sun rays. To this purpose, sensors of the type currently used for automatic air conditioners can be used, so as to integrate in time the contribution of radiations and heat exchange between motor vehicle and environment.

As far as the previous actuations of the actuator under examination are concerned, one should consider a heat exchange pattern taking into account the duration of pulses and of cooling rest times, electric power given to the actuator and heat exchanges with the environment around the actuator. This information, together with the knowledge of starting temperature, enables to estimate the temperature reached by the actuator. Depending on said temperature, the system can set longer and longer maximum cooling rest times and shorter and shorter maximum heating times.

The knowledge of temperature on the actuator can be obtained through:

direct temperature detection with a convenient local sensor, direct temperature detection with acquisition of impedance values of the active position of the actuator before actuation, monitoring of actuator impedance during actuation with high impedance systems or the like placed parallel to actuator, or with the alternation of acquisitions and supplies with the use of supply choppered by PVM pulses, estimate of the actuation time of the last actuation carried out together with rest time. Said solution applied to actuation with feedback position. When a first actuation takes place, actual actuation time is detected. Said time, with set voltage, is proportional to the starting temperature of the actuator and thus enables an estimate of local temperature.

Taking into account also the following rest time, with patterns of heat exchange with the environment, the starting temperature of the actuator can be estimated. Said strategy, however, does not allow temperature estimate for the first actuation after long rest times with variation of environmental conditions. Moreover, the two last strategies referred to above require the use of a memory to take into account the hysteretic behavior of the material.

The information on local actuator heating can be used for:

modulating the duration of a constant supply pulse, for instance for reducing pulse duration if temperature is high or extending it if temperature is low;

modulating the duration of a maximum supply pulse in cases of feedback.

Actuation Optimization Through Current Control

If battery voltage is sufficient to allow the modulation of the supply voltage of the actuator (current control of actuator), i.e. for thin wires, in case of slow actuations or of high voltage (12 V or 42 V), the supply voltage of the actuator can be modulated so as to enable an optimized heating, reducing as much as possible unnecessary heat dispersions, according to several possible strategies:

more current at low temperature so as to accelerate actuation;

less current at high temperature;

variable current for fast proportion control (higher immediately, slowed down upon approach of requested position, which requires a continuous position control);

variable current so as to keep speed constant in slow actuations (time>1 s), if the actuator requires more energy immediately, due to more intense heat exchange with surrounding environment, and then less and less energy due to environment heating;

low direct current (under actuation threshold) for preheating;

variable current at two levels for choppered actuations by keeping position (more current for displacement, less current for keeping position).

Obviously, though the basic idea of the invention remains the same, construction details and embodiments can widely vary with respect to what has been described and shown by mere way of example, however without leaving the framework of the present invention.

What is claimed is:

1. A method for controlling one or more shape-memory actuators, each comprising at least one shape-memory element, which can change its shape upon variation of its temperature beyond a transition value, in which means are arranged for supplying an electric current through the shape-memory element of each shape-memory actuator, wherein said method includes the following steps:

detecting environmental conditions of each shape-memory actuator by monitoring or evaluating the temperature of the shape-memory element and, optionally, monitoring or evaluating or more parameters chosen among: environment temperature, electric supply voltage, and controlling the intensity and/or duration of electric current supplied to each shape-memory element as a function of detected environmental conditions, wherein said monitoring or evaluating said temperature of the shape-memory element is:

(i) detected on the basis of the impedance of the shape memory element before activation thereof, or
(ii) detected by monitoring the actuator impedance during actuation, or
(iii) estimated on the basis of:
the heat exchange pattern, including the duration of actuation pulses and of cooling rest times, and
the electric power given to the actuator, and
the starting temperature of the actuator.

2. The method according to claim 1, in which on the basis of detected environmental conditions, one or more of the following operations are enabled: variation of duration of supply pulse to shape-memory element, pre-heating of shape-memory element, variation of supply voltage, setting of cooling rest times in which the activation of the shape-memory element is inhibited.

3. The method according to claim 1, wherein pre-heating pulses are provided to the shape-memory element with an insufficient power for causing its activation, but such as to bring the shape-memory element to temperatures suitable for a following activation in a relatively short time.

4. The method according to claim 3, wherein the achievement by the shape-memory element of the actuation configuration is detected, and supply is interrupted as soon as this configuration is detected.

5. The method according to claim 1, wherein a maximum time is set, after which the supply pulse to the shape-memory element is interrupted.

6. The method according to claim 5, wherein said maximum time is adjusted as a function of environmental parameters, including environmental temperature and actual or alleged actuator temperature, as well as, if necessary, of battery supply voltage.

7. The method according to claim 1, wherein after each actuation a cooling rest time is set, during which the supply to the shape-memory element is inhibited.

8. The method according to claim 7, wherein after said inhibition rest time, a further check rest time is set, during which the supply to the shape-memory element is allowed, said check rest time being then reduced up to an admissible minimum value, if no request of activation of the shape-memory element takes place during said time, and increasing again if said requests occur.

9. The method according to claim 1, wherein supply current to the shape-memory element is modulated according to one of the following strategies:
more current at lower temperatures, so as to accelerate actuation, and less current at higher temperatures;
higher current immediately upon actuation, slowed down upon approach of requested position, for a continuous position control;
variable current so as to keep speed constant in slow actuations (time >1 second), providing higher current immediately, when a more intense heat exchange with the surrounding environment is required, and then less and less current, due to the environment heating;
low current, under actuation threshold, for pre-heating;
more current for displacement, less current for keeping position.

10. A system for controlling one or more shape-memory actuators, each comprising at least one shape-memory element, which can change its shape upon variation of its temperature beyond a transition value, comprising means for supplying an electric current through the shape-memory element of each shape-memory actuator,
wherein said system comprises:
means for detecting environmental conditions of each shape-memory actuator by monitoring the temperature of the shape-memory element and, optionally, monitoring or evaluating one or more parameters chosen among: environment temperature, electric supply voltage, previous actuations or actuation requests, and
means for controlling the intensity and/or duration of electric current supplied to each shape-memory element as a function of detected environmental conditions,
wherein said system further comprises means for detecting or evaluating the temperature of the shape-memory element either on the basis of the impedance of the shape memory element before activation thereof, or on the basis of monitoring the actuator impedance during actuation thereof, or on the basis of:
the heat exchange pattern, including the duration of actuation pulses and of cooling rest times, and
the electric power given to the actuator, and
the starting temperature of the actuator.

11. The system according to claim 10, wherein it comprises electronic control means programmed for receiving signals referring to environmental conditions and for controlling the shape-memory elements of one or more shape-memory actuators belonging to the system.

12. A motor vehicle comprising a plurality of mobile operating members, such as for instance door locks, supply elements in an air conditioning unit, adjustable mobile elements such as rear-view mirrors, said motor vehicle further comprising a plurality of memory-shape actuators for acting upon said mobile operating members, characterized in that the motor vehicle is equipped with a system according to claim 11.

13. The motor vehicle according to claim 11, wherein at least one of said shape-memory actuators can activate the release of a door lock of the motor vehicle, in that the motor vehicle is equipped with means for identifying a member authorized to open the door and carried by the user, in order to enable lock release, wherein the control system which the motor vehicle is equipped with supplies an electric current to the shape-memory element of the shape-memory element with an insufficient power for causing its activation, in order to pre-heat the shape-memory element as soon as the vicinity of said member authorized to opening is detected, in order to enable a rapid intervention of the memory-shape actuator when the latter is then controlled.

14. The motor vehicle according to claim 13, wherein the control system enables the aforesaid pre-heating function only if an environment temperature below a given threshold value is detected.

* * * * *